United States Patent
Xu et al.

(10) Patent No.: US 10,484,204 B2
(45) Date of Patent: Nov. 19, 2019

(54) DATA PROCESSING METHOD AND APPARATUS

(71) Applicant: HUAWEI TECHNOLOGIES CO., LTD, Shenzhen, Guangdong (CN)

(72) Inventors: Jiangping Xu, Shanghai (CN); Meisheng Liu, Shanghai (CN); Yong Liu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 113 days.

(21) Appl. No.: 15/654,355

(22) Filed: Jul. 19, 2017

(65) Prior Publication Data
US 2017/0317851 A1 Nov. 2, 2017

Related U.S. Application Data

(63) Continuation of application No. PCT/CN2015/089390, filed on Sep. 10, 2015.

(30) Foreign Application Priority Data

Jan. 20, 2015 (CN) .......................... 2015 1 0028080

(51) Int. Cl.
*H04L 12/46* (2006.01)
*G06F 9/455* (2018.01)
*H04L 12/931* (2013.01)

(52) U.S. Cl.
CPC ...... *H04L 12/4641* (2013.01); *G06F 9/45558* (2013.01); *H04L 49/70* (2013.01); *G06F 2009/45595* (2013.01)

(58) Field of Classification Search
CPC ....... G06F 9/45558; G06F 2009/45595; G06F 9/45533; H04L 12/4641; H04L 12/46; H04L 49/70
(Continued)

(56) References Cited

U.S. PATENT DOCUMENTS 9,014,191 B1 * 4/2015 Mandal ............... H04L 12/4633 370/392
2014/0376555 A1 12/2014 Choi et al.
(Continued)

FOREIGN PATENT DOCUMENTS

CN 101521623 A 9/2009
CN 102215156 A 10/2011
(Continued)

OTHER PUBLICATIONS

International Search Report dated Dec. 9, 2015 in corresponding International Application No. PCT/CN2015/089390.
(Continued)

*Primary Examiner* — Rownak Islam
(74) *Attorney, Agent, or Firm* — Staas & Halsey LLP (57) ABSTRACT

This application provides a data processing method and apparatus. The method includes: receiving, by a first VNFC a first data packet and a flow label of the first data packet that are sent by a second VNFC, where the flow label is generated by the second VNFC according to flow information of the first data packet or is received by the second VNFC from a third VNFC; and selecting, by the first VNFC according to the flow label, a first processing node configured to process the first data packet, where the first processing node is a processing node in the first VNFC. By means of the method in this application, system consumption can be reduced, and processing efficiency of a data packet can be improved.

6 Claims, 6 Drawing Sheets

(58) Field of Classification Search
USPC .................................................. 370/395.53
See application file for complete search history.

(56) References Cited

U.S. PATENT DOCUMENTS

2015/0281066 A1* 10/2015 Koley ..................... H04L 49/70
370/392
2015/0312142 A1* 10/2015 Barabash ................ H04L 45/42
370/400
2017/0054639 A1* 2/2017 Zhou ..................... H04W 92/02

FOREIGN PATENT DOCUMENTS

| CN | 103607349 A | 2/2014 |
| CN | 103746892 A | 4/2014 |
| CN | 104134122 A | 11/2014 |

OTHER PUBLICATIONS

International Search Report dated Sep. 12, 2015 in corresponding International Patent Application No. PCT/CN2015/089390.
"Network Functions Virtualisation (NFV); Virtual Network Functions Architecture," ETSI GS NFV-SWA 001, V1.1.1, Dec. 2014.
Chinese Office Action dated Jul. 3, 2018 in corresponding Chinese Patent Application No. 201510028080.6, 5 pgs.

* cited by examiner

DATA PROCESSING METHOD AND APPARATUS

CROSS-REFERENCE TO RELATED APPLICATIONS

This application is a continuation of International Application No. PCT/CN2015/089390, filed on Sep. 10, 2015, which claims priority to Chinese Patent Application No. 201510028080.6, filed on Jan. 20, 2015, The disclosures of the aforementioned applications are hereby incorporated by reference in their entireties.

TECHNICAL FIELD

This application relates to the field of communications technologies, and in particular, to a data processing method and apparatus.

BACKGROUND

Network function virtualization (NFV) bears a function of a specialized device in a conventional network by using a general-purpose hardware device and a virtualization technology to implement software/hardware decoupling, so that a network device no longer relies on special-purpose hardware, thereby reducing high costs due to deployment of the specialized device. A party that can receive a virtualization request and perform virtualization processing on a corresponding service according to the request is referred to as a virtualization service provider. A party that initiates the virtualization request is referred to as a service requester.

A virtualized network service (NS) in NFV may be a network service of an IP multimedia subsystem (IMS), or may be a network service of an Evolved Packet Core (EPC). One NS may further include several virtualized network function (VNF) modules. One VNF may include multiple virtualized network function components (VNFC). Each VNFC includes multiple processing nodes. A packet needs to be processed by at least two VNFCs in the VNF.

Figure 1:
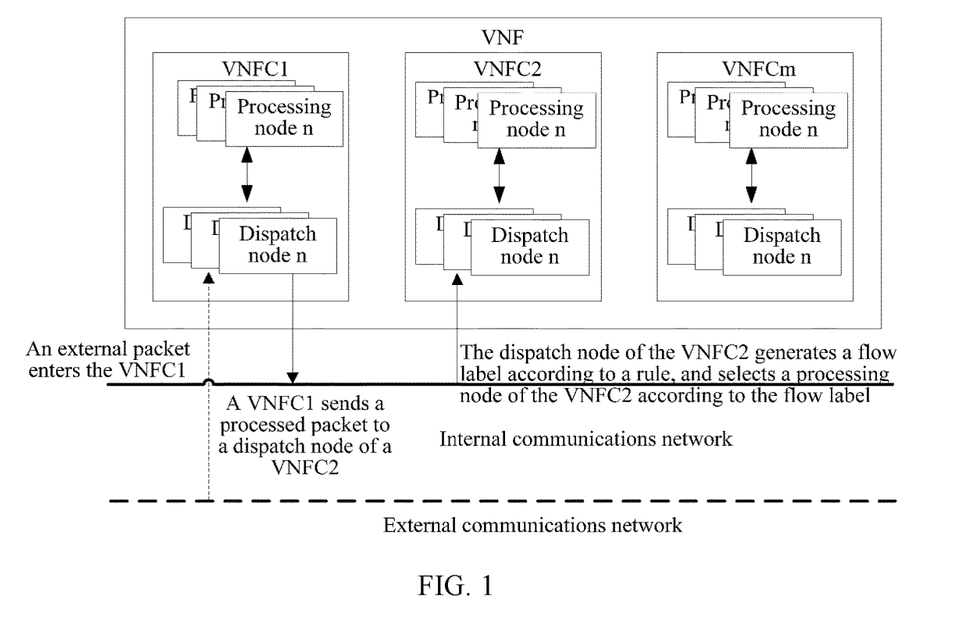
FIG. 1 is a schematic diagram of a packet processing process according to the prior art.

Referring to FIG. 1, FIG. 1 is a schematic diagram of a process of packet processing in the prior art. As shown in FIG. 1, a packet is input to a VNFC1 inside the VNF by using an external communications network, and is forwarded to a VNFC2 after being processed by the VNFC1. Then a dispatch node receiving the packet in the VNFC2 obtains flow information according to a rule and generates a flow label, and then selects a processing node of the VNFC2 according to the flow label. The entire processing procedure is complex, and efficiency is relatively low. Consequently, system overheads are relatively large.

SUMMARY

Embodiments of this application provide a data processing method and apparatus, to resolve technical problems in the prior art that system overheads are relatively high and processing efficiency is relatively low because it is complex for a VNFC to generate a flow label.

A first aspect of this application provides a data processing method, including:

receiving, by a first virtualized network function component VNFC, a first data packet and a flow label of the first data packet that are sent by a second VNFC, where the flow label is generated by the second VNFC according to flow information of the first data packet or is received by the second VNFC from a third VNFC; and selecting, by the first VNFC according to the flow label, a first processing node configured to process the first data packet, where the first processing node is a processing node in the first VNFC.

With reference to the first aspect, in a first possible implementation manner of the first aspect, after the selecting, by the first VNFC according to the flow label, a first processing node configured to process the first data packet, the method further includes:

processing the first data packet by using the first processing node to obtain a second data packet;

selecting a dispatch node of a fourth VNFC according to the flow label; and sending the second data packet and the flow label to the selected dispatch node of the fourth VNFC.

With reference to the first possible implementation manner of the first aspect, in a second possible implementation manner of the first aspect, before the selecting a dispatch node of a fourth VNFC according to the flow label, the method further includes:

determining that a granularity of flow information of the second data packet is not finer than a granularity of the flow information for generating the flow label.

With reference to the first aspect, in a third possible implementation manner of the first aspect, after the selecting, by the first VNFC according to the flow label, a first processing node configured to process the first data packet, the method further includes:

processing the first data packet by using the first processing node to obtain a second data packet;

determining that a granularity of flow information of the second data packet is finer than a granularity of the flow information for generating the flow label;

generating a new flow label according to the flow information of the second data packet;

selecting a dispatch node of a fourth VNFC according to the new flow label; and sending the second data packet and the new flow label to the selected dispatch node of the fourth VNFC.

With reference to the third possible implementation manner of the first aspect, in a fourth possible implementation manner of the first aspect, the generating a new flow label according to the flow information of the second data packet includes:

obtaining new flow information according to a flow classification granularity, and obtaining the new flow label by performing hash calculation on the new flow information; or obtaining flow information in a tunnel according to a feature of the tunnel, and obtaining the new flow label by performing hash calculation on the flow information in the tunnel.

A second aspect of this application provides a data processing apparatus, including: a first dispatch node and M processing nodes, where M is an integer greater than or equal to 2; and the first dispatch node is configured to: receive a first data packet and a flow label of the first data packet that are sent by a second virtualized network function component VNFC, where the flow label is generated by the second VNFC according to flow information of the first data packet or is received by the second VNFC from a third VNFC; and select, according to the flow label of the first data packet, a first processing node configured to process the first data packet, where the first processing node is a processing node of the M processing nodes.

With reference to the second aspect, in a first possible implementation manner of the second aspect, the first processing node is configured to: process the first data packet received by the first dispatch node to obtain a second data packet; and select a dispatch node of a fourth VNFC according to the flow label; and the first dispatch node is further configured to send the second data packet and the flow label to the dispatch node of the fourth VNFC selected by the first processing node.

With reference to the first possible implementation manner of the second aspect, in a second possible implementation manner of the second aspect, the first processing node is further configured to: before selecting the dispatch node of the fourth VNFC according to the flow label, determine that a granularity of flow information of the second data packet is not finer than a granularity of the flow information for generating the flow label.

With reference to the second aspect, in a third possible implementation manner of the second aspect, the first processing node is configured to: process the first data packet received by the first dispatch node to obtain a second data packet; determine that a granularity of flow information of the second data packet is finer than a granularity of the flow information for generating the flow label; generate a new flow label according to the flow information of the second data packet; and select a dispatch node of a fourth VNFC according to the new flow label; and the first dispatch node is further configured to send the second data packet and the new flow label to the dispatch node of the fourth VNFC selected by the first processing node.

With reference to the third possible implementation manner of the second aspect, in a fourth possible implementation manner of the second aspect, the first processing node is specifically configured to: obtain new flow information according to a flow classification granularity, and obtain the new flow label by performing hash calculation on the new flow information; or obtain flow information in a tunnel according to a feature of the tunnel, and obtain the new flow label by performing hash calculation on the flow information in the tunnel.

A third aspect of this application provides a network device, including: a processor, a memory, a transmitter, and a receiver, where a virtualized network function VNF is deployed on the network device and is configured to implement a particular network function by using the processor, the memory, the transmitter, and the receiver;

the VNF includes a first VNFC, a second VNFC, and a third VNFC; and a first dispatch node of the first VNFC is configured to: receive a first data packet and a flow label of the first data packet that are sent by the second VNFC, where the flow label is generated by the second VNFC according to flow information of the first data packet or is received by the second VNFC from the third VNFC; and select, according to the flow label, a first processing node configured to process the first data packet, where the first processing node is a processing node in the first VNFC.

With reference to the third aspect, in a first possible implementation manner of the third aspect, the VNF further includes a fourth VNFC; and the first processing node is configured to: process the first data packet to obtain a second data packet, and select a dispatch node of the fourth VNFC according to the flow label; and the first dispatch node of the first VNFC is further configured to send the second data packet and the flow label to the dispatch node of the fourth VNFC selected by the first processing node.

With reference to the first possible implementation manner of the third aspect, in a second possible implementation manner of the third aspect, the first processing node is further configured to: before selecting the dispatch node of the fourth VNFC according to the flow label, determine that a granularity of flow information of the second data packet is not finer than a granularity of the flow information for generating the flow label.

With reference to the third aspect, in a third possible implementation manner of the third aspect, the VNF further includes a fourth VNFC; and the first processing node is configured to: process the first data packet to obtain a second data packet; determine that a granularity of flow information of the second data packet is finer than a granularity of the flow information for generating the flow label; generate a new flow label according to the flow information of the second data packet; and select a dispatch node of the fourth VNFC according to the new flow label; and the dispatch node of the first VNFC is further configured to send the second data packet and the new flow label to the dispatch node of the fourth VNFC selected by the first processing node.

With reference to the third possible implementation manner of the third aspect, in a fourth possible implementation manner of the third aspect, the first processing node is specifically configured to: obtain new flow information according to a flow classification granularity, and obtain the new flow label by performing hash calculation on the new flow information; or obtain flow information in a tunnel according to a feature of the tunnel, and obtain the new flow label by performing hash calculation on the flow information in the tunnel.

One or more technical solutions provided in embodiments of this application have at least the following technical effects or advantages:

In the embodiments of this application, a first data packet that is sent by a second VNFC and that is received by a first VNFC carries a flow label, where the flow label is generated by the second VNFC according to flow information of the first data packet or is received by the second VNFC from a third VNFC. Therefore, the first VNFC does not need to generate the flow label according to a rule as in the prior art. Instead, the first VNFC directly selects, according to the flow label carried in the first data packet, a first processing node configured to process the first data packet. Therefore, system overheads are reduced, and moreover, data packet processing efficiency is also improved because a step of generating the flow label again is omitted. Therefore, compared with a method for generating a flow label by a VNFC in the prior art, the method in the embodiments of this application achieves relatively low system overheads and relatively high processing efficiency.

DESCRIPTION OF EMBODIMENTS

Embodiments of this application provide a data processing method and apparatus, to resolve technical problems in the prior art that system overheads are relatively high and processing efficiency is relatively low due to generation of a flow label by a VNFC in a VNF.

To make the objectives, technical solutions, and advantages of the embodiments of this application clearer, the following clearly describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

Figure 2:
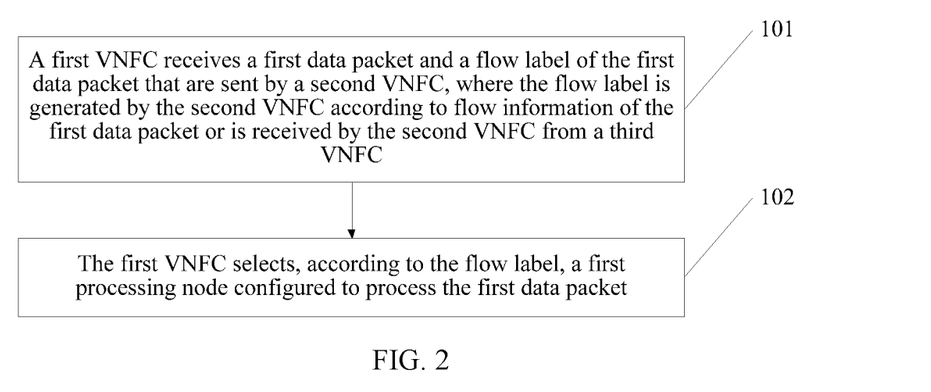
FIG. 2 is a flowchart of a data processing method according to an embodiment of this application.

Referring to FIG. 2, FIG. 2 is a flowchart of a data processing method according to an embodiment of this application. The method includes the following content:

Step 101: A dispatch node of a first VNFC receives a first data packet and a flow label of the first data packet that are sent by a second VNFC, where the flow label is generated by the second VNFC according to flow information of the first data packet or is received by the second VNFC from a third VNFC.

Step 102: The first VNFC selects, according to the flow label, a first processing node configured to process the first data packet, where the first processing node is a processing node in the first VNFC.

In this embodiment of this application, the first VNFC, the second VNFC, the third VNFC, and a fourth VNFC that is subsequently described are VNFCs in a same VNF.

The first data packet in this embodiment of this application may be, for example, a packet.

In step 101, the flow label is generated by the second VNFC according to the flow information of the first data packet. This includes, but is not limited to, the following three cases.

In the first case, the second VNFC is an external data packet source, that is, the first data packet is transmitted to the second VNFC by using an external communications network. In this case, when receiving the first data packet, the second VNFC extracts the flow information of the first data packet according to a rule, and then generates the flow label according to the flow information.

Specifically, the extracting the flow information according to a rule may be classified into two cases: a tunnel type and a non-tunnel type, according to different communication manners between the VNF and an external network element. For the non-tunnel type, flow information of data flows having different granularities may be obtained according to a flow classification granularity, for example, a triplet (a source IP address, a destination IP address, and a protocol number), for another example, a quintet (a source IP address, a destination IP address, a source port, a destination port, and a protocol number), and for another example, a user-level flow (a destination IP address). Then hash calculation is performed on the flow information to generate the flow label.

For the tunnel type, flow information in a tunnel may be obtained according to a feature of the tunnel. For example, if a GPRS Tunneling Protocol (GTP) is used, the flow information is a tunnel endpoint identity (TEID) or a tunnel identity (TID). If the tunnel is an Internet Protocol security (IPSEC) tunnel, the flow information is a security parameter index (SPI). If a Layer Two Tunneling Protocol (L2TP) is used, the flow information may be a TID. If the tunnel is an IPinIP tunnel, the flow information may be a triplet or a quintet. Then hash calculation is performed on the flow information to generate the flow label. IPinIP is an IP tunneling protocol. According to this protocol, an IP encapsulated packet is encapsulated into another IP encapsulated packet.

It should be noted that in addition to performing hash calculation on the flow information, processing in another manner may be performed on the flow information to generate the flow label. Compared with direct use of the flow information, using the flow label that is generated after the flow information is processed may reduce a calculation amount.

Further, after generating the flow label, a dispatch node of the second VNFC may further select, according to the flow label, a processing node configured to process the first data packet. The processing node is a processing node of the second VNFC. Then, the processing node processes the first data packet. After the processing is completed, the processed first data packet needs to be forwarded to the first VNFC. Therefore, the processing node selects a dispatch node of the first VNFC according to the generated flow label, sends the processed first data packet to the selected dispatch node of the first VNFC by using an internal communications network, and also sends the generated flow label to the first VNFC. The flow label is specifically, for example, carried in an internal communications header for sending the first data packet. Therefore, correspondingly, after receiving the packet, the first VNFC may perform step 101.

In the second case, the second VNFC is an internal data packet source, that is, the second VNFC generates the first data packet. Then, the second VNFC obtains the flow information of the first data packet according to a rule and generates the flow label. A process of generating the flow label is the same as the content in the first case. In addition, another processing manner of the second VNFC is the same as that described in the first case. Therefore, details are not described herein again.

In the third case, the second VNFC is not the source of the first data packet, but receives the first data packet from the third VNFC. The third VNFC is a VNFC prior to the second VNFC. When receiving the first data packet sent by the third VNFC, the second VNFC selects, according to the flow label of the first data packet, a processing node configured to process the first data packet. The processing node is a processing node in the second VNFC. After finishing processing, the processing node needs to forward the first data packet to the first VNFC. If the second VNFC identifies flow information of a finer granularity, a new flow label is generated according to the identified flow information.

Then, the second VNFC selects a dispatch node of the first VNFC according to the new flow label, sends the processed first data packet to the selected dispatch node of the first VNFC, and also sends the new flow label to the dispatch node of the first VNFC. Correspondingly, the first VNFC performs step 101.

A case in which the flow label in step 101 is a flow label received by the second VNFC from the third VNFC differs from the third case is that: After the processing node of the second VNFC finishes processing, the second VNFC does not identify flow information of a finer granularity, or does not perform an identification action, and therefore the second VNFC continues to select a dispatch node of the first VNFC according to the flow label received from the third VNFC, sends the processed first data packet to the selected dispatch node of the first VNFC, and also sends the flow label to the dispatch node of the first VNFC.

In step 101, the flow label of the first data packet is received. Therefore, step 102 is then performed, that is, the first VNFC selects, according to the flow label, a first processing node configured to process the first data packet. A processing node is selected by using a flow label, to achieve a load balancing effect. In addition, selecting a processing node by using a flow label also ensures that data packets with a same flow label can be dispatched to a same processing node for processing, achieving a sequence preserving effect.

In an actual application, selecting a processing node according to a flow label is specifically, for example, performing modulo operation is performed by using the flow label and a quantity of processing nodes of the first VNFC, and a result of the operation is a number or an identifier of the corresponding processing node. Certainly, selection may be performed by using another algorithm. This part of content is content known to a person skilled in the art. Therefore, details are not described herein.

As can be seen from the foregoing description, the first data packet that is sent by the second VNFC and that is received by the first VNFC includes the flow label generated by the second VNFC according to the flow information of the first data packet. Therefore, the first VNFC does not need to generate the flow label according to a rule as in the prior art. Instead, the first VNFC directly selects a processing node according to the flow label carried in the first data packet. Therefore, system overheads are reduced, and moreover, data packet processing efficiency is also improved because a step of generating the flow label again is omitted. Therefore, compared with a method for generating a flow label by a VNFC in the prior art, the method in the embodiments of this application achieves relatively low system overheads and relatively high processing efficiency.

In a first possible implementation manner, after step 102, if the VNF actively sends the first data packet, and the processing step of the first VNFC is the last processing step in the VNF, after the first processing node performs processing, the dispatch node of the first VNFC sends the processed first data packet to an external network.

In a second possible implementation manner, after step 102, if the VNF receives the first data packet, and the processing step of the first VNFC is the last processing step in the VNF, after the selected processing node performs processing, the processing procedure is ended.

In a third possible implementation manner, after step 102, regardless of whether the VNF receives the first data packet or actively sends the first data packet, the processing step of the first VNFC is not the last processing step in the VNF. In other words, after processing the first data packet, the first processing node further needs to send the processed first data packet to a dispatch node of the fourth VNFC. Therefore, in this embodiment, after step 102, the first processing node processes the first data packet to obtain a second data packet; selects a dispatch node of the fourth VNFC according to the flow label in step 102; and then sends the second data packet and the flow label to the selected dispatch node of the fourth VNFC.

Specifically, the dispatch node of the fourth VNFC is selected according to the flow label in step 102, and the selection may be performed according to a result that is obtained by performing a modulo operation according to the flow label and a quantity of dispatch nodes of the fourth VNFC. The method for performing selection according to the flow label is content known to a person skilled in the art. Therefore, details are not described herein.

When forwarding the second data packet to the fourth VNFC, the first VNFC further forwards the flow label to the fourth VNFC. Therefore, when selecting a processing node, the fourth VNFC does not need to generate a flow label again. Instead, the fourth VNFC directly selects a processing node by using the flow label sent by the current VNFC. In this way, the flow label may be shared by VNFCs, thereby reducing system overheads, and improving data packet processing efficiency of the VNFCs.

In a fourth possible implementation manner, after the first processing node finishes processing the first data packet to obtain the second data packet, because each VNFC in the VNFs has a different processing function, a latter VNFC in the processing procedure may identify more content of a data packet than a former VNFC in the processing procedure. Therefore, the first VNFC may identify a flow of a finer granularity. For example, for the TCP/IP protocol, the former VNFC may identify only three layers, while the latter VNFC may identity the fourth to the seventh layers. Therefore, after step 102, the first processing node processes the first data packet to obtain the second data packet; determines that a granularity of flow information of the second data packet is finer than a granularity of the flow information for generating the flow label; generates a new flow label according to the flow information of the second data packet; selects a dispatch node of the fourth VNFC according to the new flow label; and sends the second data packet and the new flow label to the selected dispatch node of the fourth VNFC. In this way, a better load balancing effect may be achieved.

Therefore, after receiving the first data packet, the fourth VNFC selects a processing node according to the new flow label.

If determining that a granularity of flow information of the second data packet is not finer than a granularity of the flow information for generating the flow label, the first processing node may directly perform processing according to the third possible implementation manner.

It should be noted that in the fourth possible implementation manner, the generating a new flow label specifically includes: obtaining, by the first processing node, new flow information according to a flow classification granularity, and obtaining the new flow label by performing hash calculation on the new flow information; or obtaining, by the selected processing node, flow information in a tunnel according to a feature of the tunnel, and obtaining the new flow label by performing hash calculation on the flow information in the tunnel, where a specific process is similar to the process of generating the flow label in step 102, and therefore, details are not described herein again.

A specific implementation process of the data processing method in this embodiment of this application is described below by using some specific examples.

Figure 3:
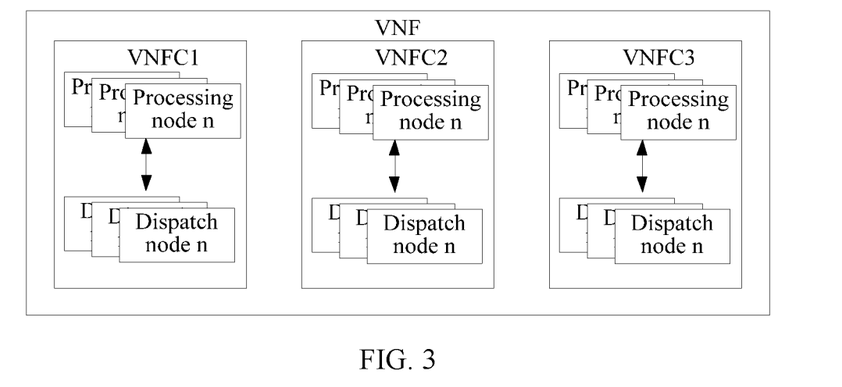
FIG. 3 is a structural diagram of a VNF according to an embodiment of this application.

First, referring to FIG. 3, FIG. 3 is a structural diagram of a VNF according to an embodiment of this application. It is assumed that the VNF includes three VNFCs, which are a VNFC1, a VNFC2, and a VNFC3. Each VNFC includes n processing nodes: a processing node 1 to a processing node n, and n dispatch nodes: a dispatch node 1 to a dispatch node n, where n is a positive integer greater than or equal to 2.

Figure 4:
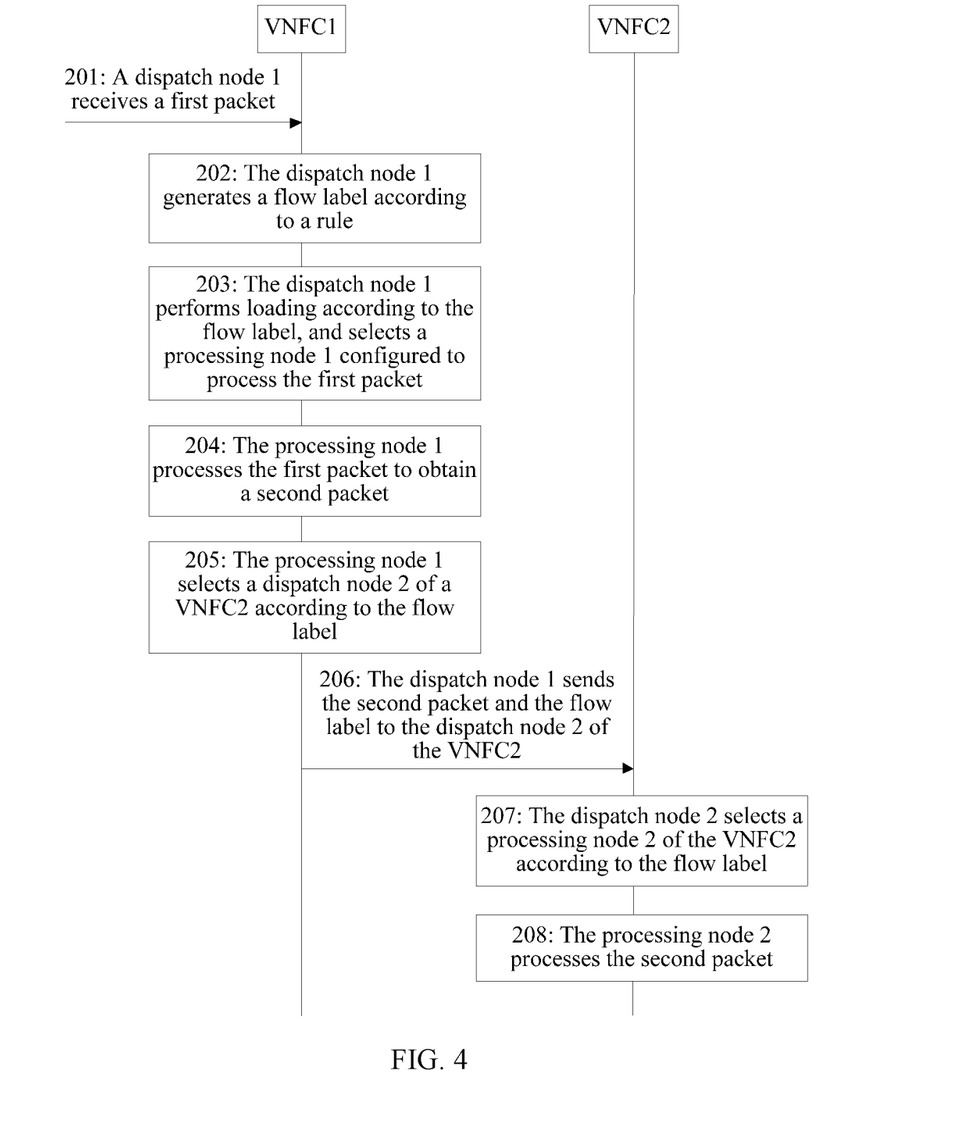
FIG. 4 is a schematic diagram of an instance of a first data processing method according to an embodiment of this application.

First instance: it is assumed that the dispatch node 1 of the VNFC1 receives a first packet by using an external communications network. The first packet needs to be processed by the VNFC1 and the VNFC2 in the VNF. Referring to FIG. 3 and FIG. 4, FIG. 4 is a flowchart of a data processing method according to this embodiment. The method includes the following content.

Step 201: A dispatch node 1 of a VNFC1 receives a first packet.

Step 202: The dispatch node 1 of the VNFC1 generates a flow label according to a rule, specifically, for example, obtains flow information according to a flow classification granularity, and generates the flow label by performing a hash calculation on the flow information; or obtains flow information in a tunnel according to a feature of the tunnel, and generates the flow label by performing a hash calculation on the flow information.

Step 203: The dispatch node 1 of the VNFC1 selects, according to the flow label, a processing node configured to process the first packet, where a result of the selection may be, for example, a processing node 1, and the selection performed according to the flow label is, for example, mode selection.

Step 204: The processing node 1 processes the first packet, where the processed packet is referred to as a second packet.

Step 205: The processing node 1 selects a dispatch node of a VNFC2 according to the flow label, where a result of the selection is, for example, a dispatch node 2.

Step 206: The dispatch node 1 of the VNFC1 sends the second packet and the flow label to the dispatch node 2 of the VNFC2.

Step 207: The dispatch node 2 of the VNFC2 selects a processing node of the VNFC2 according to the flow label, where a result of the selection is, for example, a processing node 2.

Step 208: The processing node 2 processes the second packet.

In this example, the packet needs to be processed by only two VNFCs. Therefore, after step 208 is performed, the data processing procedure ends.

Figure 5:
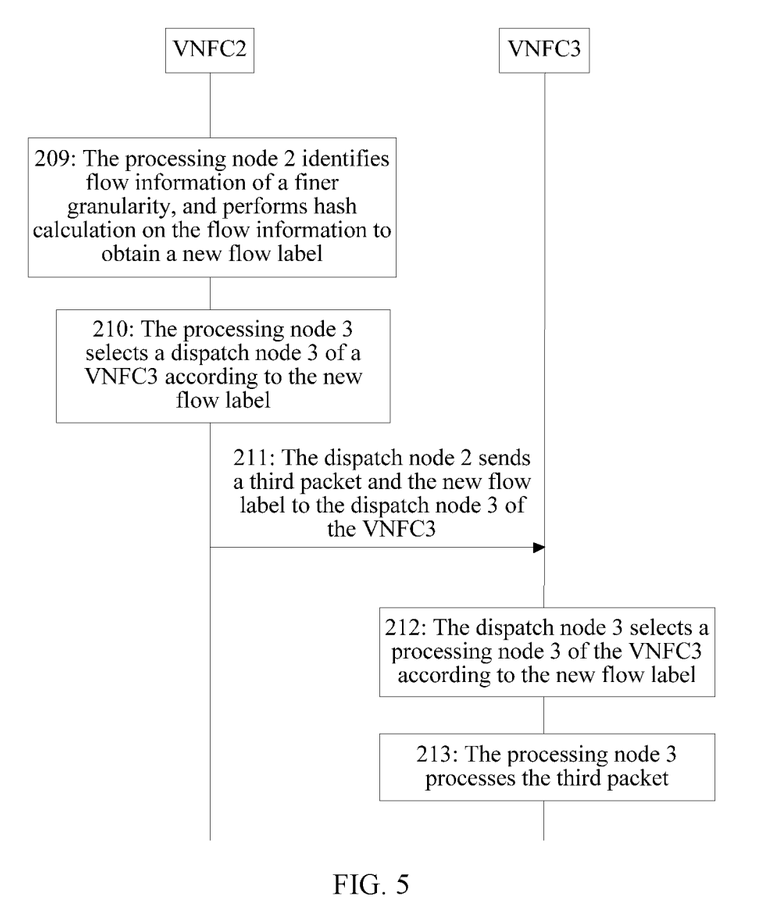
FIG. 5 is a schematic diagram of an instance of a second data processing method according to an embodiment of this application.

Second instance: in this instance, it is assumed that the first packet input from the outside further needs to be processed by a VNFC3. Therefore, after step 208, the VNFC2 further needs to forward the processed second packet to the VNFC3. It is assumed that after processing in step 208, a third packet is obtained.

Referring to FIG. 3 and FIG. 5, FIG. 5 is a flowchart of a data processing method according to this embodiment. The method includes the following content.

Step 209: The processing node 2 identifies flow information of a finer granularity, and performs hash calculation on the flow information to obtain a new flow label. For example, it is assumed that in step 202, the obtained flow information is a triplet. The flow information identified in step 209 is a quintet whose granularity is finer.

Step 210: The processing node 2 selects a dispatch node of a VNFC3 according to the new flow label, where a result of the selection is a dispatch node 3.

Step 211: The dispatch node 2 sends the third packet and the new flow label to the dispatch node 3 of the VNFC3.

Step 212: The dispatch node 3 of the VNFC3 selects a processing node of the VNFC3 according to the new flow label, where it is assumed that a result of the selection is a processing node 3.

Step 213: The processing node 3 processes the third packet.

Figure 6:
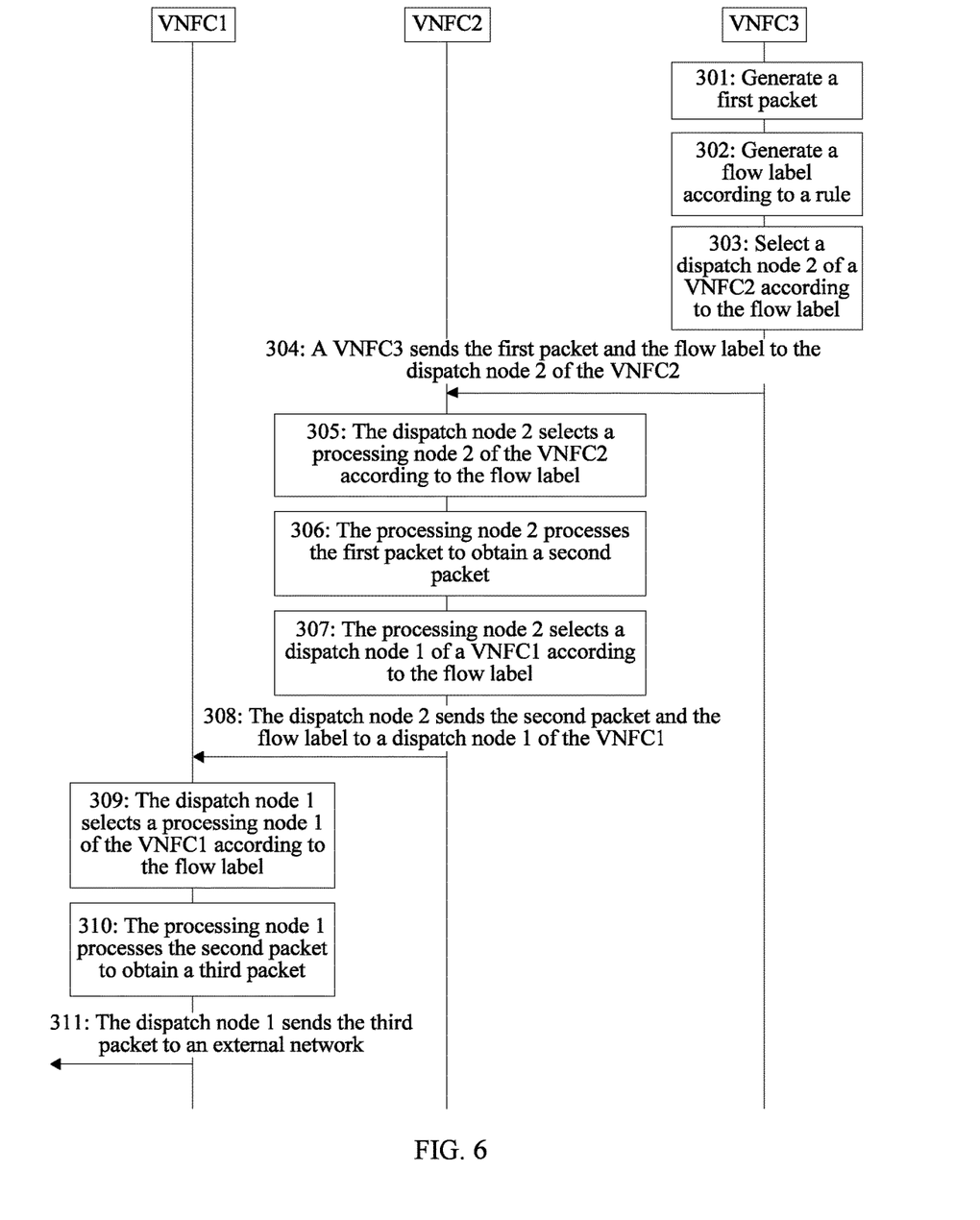
FIG. 6 is a schematic diagram of an instance of a third data processing method according to an embodiment of this application.

Third example: in this instance, it is assumed that the VNF actively sends a packet. The packet is generated by the VNFC3, is processed by the VNFC2 and the VNFC1, and then is output to an external network. Referring to FIG. 3 and FIG. 6, FIG. 6 is a flowchart of a data processing method according to this embodiment. The method includes the following content.

Step 301: A VNFC3 generates a first packet.

Step 302: Generate a flow label according to a rule, where a manner for generating the flow label is as described above.

Step 303: Select a dispatch node of a VNFC2 according to the flow label, where it is assumed that a selection result is a dispatch node 2.

Step 304: The VNFC3 sends the first packet and the flow label to the dispatch node 2 of the VNFC2.

Step 305: The dispatch node 2 selects a processing node of the VNFC2 according to the flow label, where the processing node may be, for example, a processing node 2.

Step 306: The processing node 2 processes the first packet to obtain a second packet.

Step 307: The processing node 2 selects a dispatch node of a VNFC1 according to the flow label, where the dispatch node may be, for example, a dispatch node 1.

Step 308: The dispatch node 2 sends the second packet and the flow label to the dispatch node 1 of the VNFC1.

Step 309: The dispatch node 1 selects a processing node of the VNFC1 according to the flow label, where the processing node may be, for example, a processing node 1.

Step 310: The processing node 1 processes the second packet to obtain a third packet.

Step 311: The dispatch node 1 sends the third packet to an external network.

As can be seen from the foregoing description, at a packet source, flow information is extracted according to a rule to generate a flow label. The flow label is carried in a packet. In a forwarding process of the packet in the VNF, a processing node are directly selected by using the flow label, so as to avoid that VNFCs repeatedly extract the flow information to generate the flow label in the forwarding process of the packet in the VNF, thereby greatly improving forwarding efficiency, and reducing system overheads.

Figure 7:
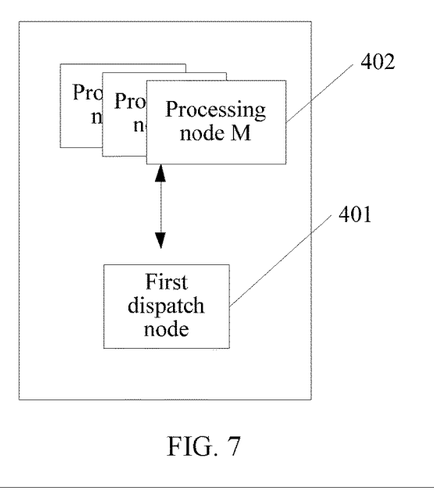
FIG. 7 is a functional block diagram of a data processing apparatus according to an embodiment of this application.

Based on a same inventive concept, referring to FIG. 7, FIG. 7 is a functional block diagram of a data processing apparatus according to an embodiment of this application, to implement the data processing method shown in FIG. 2, and FIG. 4 to FIG. 6 in the present invention. For meanings of terms involved in this embodiment, refer to the content described in the foregoing embodiments. The data processing apparatus includes: a first dispatch node 401 and M processing node 402, where M is an integer greater than or equal to 2.

The first dispatch node 401 is configured to receive a first data packet and a flow label of the first data packet that are sent by a second VNFC. The flow label is generated by the second VNFC according to flow information of the first data packet or is received by the second VNFC from a third VNFC. The first dispatch node 401 is further configured to select, according to the flow label, a first processing node configured to process the first data packet. The first processing node is a processing node of the M processing nodes 402. Optionally, the apparatus includes a second to an $N^{th}$ dispatch nodes, where N is an integer greater than or equal to 2.

Optionally, the first processing node is configured to: process the first data packet received by the first dispatch node 401 to obtain a second data packet; and select a dispatch node of a fourth VNFC according to the flow label.

The first dispatch node 401 is further configured to send the second data packet and the flow label to the dispatch node of the fourth VNFC selected by the first processing node.

Further, the first processing node is further configured to: before selecting the dispatch node of the fourth VNFC according to the flow label, determine that a granularity of flow information of the second data packet is not finer than a granularity of the flow information for generating the flow label.

Optionally, the first processing node is configured to: process the first data packet received by the first dispatch node 401 to obtain a second data packet; determine that a granularity of flow information of the second data packet is finer than a granularity of the flow information for generating the flow label; generate a new flow label according to the flow information of the second data packet; and select a dispatch node of a fourth VNFC according to the new flow label.

The first dispatch node 401 is further configured to send the second data packet and the new flow label to the dispatch node of the fourth VNFC selected by the first processing node.

Further, the first processing node is specifically configured to: obtain new flow information according to a flow classification granularity, and obtain the new flow label by performing hash calculation on the new flow information; or obtain flow information in a tunnel according to a feature of the tunnel, and obtain the new flow label by performing hash calculation on the flow information in the tunnel.

Various different manners and specific examples in the data processing method in the embodiments of FIG. 2 and FIG. 4 to FIG. 6 are also applicable to the data processing apparatus in this embodiment. According to the detailed description about the foregoing data processing method, a person skilled in the art may clearly know an implementation method of the data processing apparatus in this embodiment. Therefore, for brevity of the specification, details are not described herein.

Figure 8:
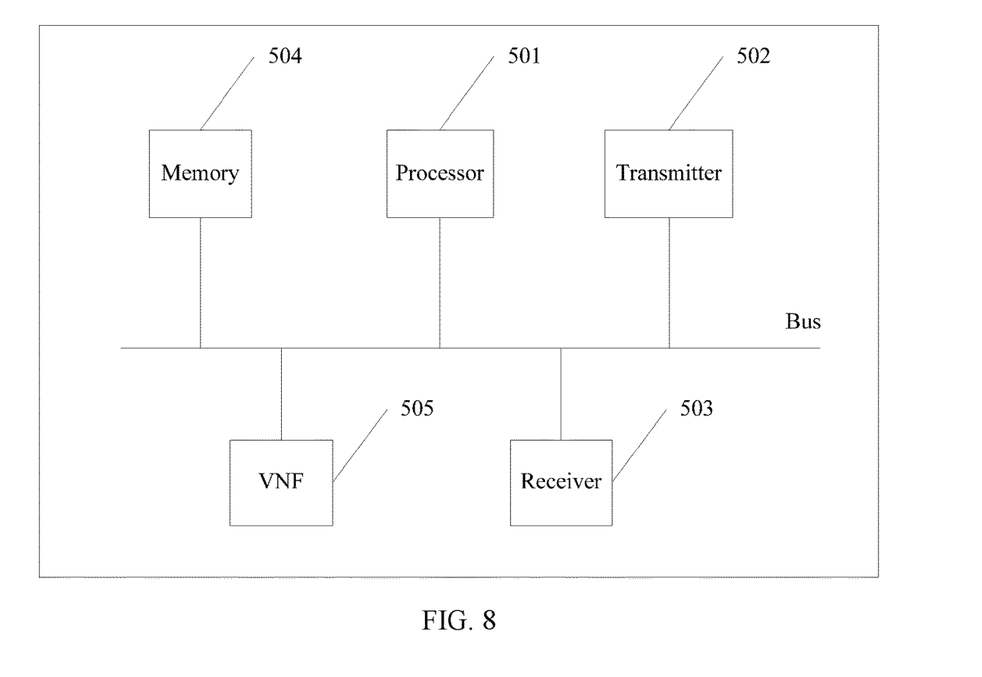
FIG. 8 is a structural block diagram of a network device according to an embodiment of this application.

Based on a same inventive concept, referring to FIG. 8, FIG. 8 is a structural block diagram of a network device according to an embodiment of this application, to implement the data processing method shown in FIG. 2, and FIG. 4 to FIG. 6 in the present invention. For meanings of terms involved in this embodiment, refer to the content described in the foregoing embodiments. The network device includes: a processor 501, a transmitter 502, a receiver 503, a memory 504, and a VNF 505. The processor 501 may be specifically a general-purpose central processing unit (CPU), an application-specific integrated circuit (ASIC), or one or more integrated circuits configured to control execution of a program. There may be one or more memories 504. The memory 504 may include a read-only memory (ROM), a random access memory (RAM), and a magnetic disk storage. These memories, the receiver 503, and the transmitter 502 are connected to the processor 501 by using a bus. The receiver 503 and the transmitter 502 are configured to perform network communication with an external device, and specifically, may communicate with the external device by using a network such as the Ethernet, a radio access network, or a wireless local area network. The receiver 503 and the transmitter 502 may be two elements physically independent of each other, or may be a same physical element.

The memory 504 may store an instruction, and the processor 501 may execute the instruction stored in the memory 504.

The VNF 505 is deployed on the network device. The VNF 505 may complete a particular network function by using a hardware resource on the network device, for example, the processor 501, the memory 504, the receiver 503, and the transmitter 502.

The VNF 505 includes multiple VNFCs, for example, a first VNFC, a second VNFC, a third VNFC, and a fourth VNFC.

A first dispatch node of the first VNFC is configured to: receive a first data packet and a flow label of the first data packet that are sent by the second VNFC. The flow label is generated by the second VNFC according to flow information of the first data packet or is received by the second VNFC from the third VNFC; and select, according to the flow label, a first processing node configured to process the first data packet. The first processing node is a processing node in the first VNFC.

Optionally, the first processing node is configured to: process the first data packet to obtain a second data packet, and select a dispatch node of the fourth VNFC according to the flow label.

The first dispatch node of the first VNFC is configured to send the second data packet and the flow label to the dispatch node of the fourth VNFC selected by the first processing node.

Further, the first processing node is further configured to: before selecting the dispatch node of the fourth VNFC according to the flow label, determine that a granularity of flow information of the second data packet is not finer than a granularity of the flow information for generating the flow label.

Optionally, the first processing node is configured to: process the first data packet to obtain the second data packet; determine that a granularity of flow information of the second data packet is finer than a granularity of the flow information for generating the flow label; generate a new flow label according to the flow information of the second data packet; and select a dispatch node of the fourth VNFC according to the new flow label.

The dispatch node of the first VNFC is further configured to send the second data packet and the new flow label to the dispatch node of the fourth VNFC selected by the first processing node.

Further, the first processing node is specifically configured to: obtain new flow information according to a flow classification granularity, and obtain the new flow label by performing hash calculation on the new flow information; or obtain flow information in a tunnel according to a feature of the tunnel, and obtain the new flow label by performing hash calculation on the flow information in the tunnel.

Various different manners and specific examples in the data processing method in the embodiments of FIG. 2 and FIG. 4 to FIG. 6 are also applicable to the network device in this embodiment. According to the detailed description about the foregoing data processing method, a person skilled in the art may clearly know an implementation method of the network device in this embodiment. Therefore, for brevity of the specification, details are not described herein.

One or more technical solutions provided in the embodiments of this application have at least the following technical effects or advantages:

In the embodiments of this application, a first data packet that is sent by a second VNFC and that is received by a first VNFC carries a flow label. The flow label is generated by the second VNFC according to flow information of the first data packet or is received by the second VNFC from a third VNFC. Therefore, the first VNFC does not need to generate the flow label according to a rule as in the prior art. Instead, the first VNFC directly selects, according to the flow label carried in the first data packet, a first processing node configured to process the first data packet. Therefore, system overheads are reduced, and moreover, data packet processing efficiency is also improved because a step of generating the flow label again is omitted. Therefore, compared within a method for generating a flow label by a VNFC in the prior art, the method in the embodiments of this application achieves relatively low system overheads and relatively high processing efficiency.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data processing method, comprising:
   receiving, by a first virtualized network function component (VNFC), a first data packet and a flow label of the first data packet that are sent by a second VNFC, wherein the flow label is generated by the second VNFC according to flow information of the first data packet or is received by the second VNFC from a third VNFC;
   selecting, by the first VNFC according to the flow label, a first processing node configured to process the first data packet, wherein the first processing node is a processing node in the first VNFC;
   processing the first data packet by using the first processing node to obtain a second data packet;
   determining that a granularity of flow information of the second data packet is finer than a granularity of the flow information for generating the flow label; and
   generating a new flow label according to the flow information of the second data packet.

2. The method according to claim 1, wherein the method further comprises:
   selecting a dispatch node of a fourth VNFC according to the new flow label; and
   sending the second data packet and the new flow label to the selected dispatch node of the fourth VNFC.

3. The method according to claim 2, wherein the generating a new flow label according to the flow information of the second data packet comprises:
   obtaining new flow information according to a flow classification granularity, and obtaining the new flow label by performing hash calculation on the new flow information; or
   obtaining flow information in a tunnel according to a feature of the tunnel, and obtaining the new flow label by performing hash calculation on the flow information in the tunnel.

4. A data processing apparatus, comprising: a first dispatch node and M processing nodes, wherein M is an integer greater than or equal to 2; and
   the first dispatch node is configured to: receive a first data packet and a flow label of the first data packet that are sent by a second virtualized network function component VNFC, wherein the flow label is generated by the second VNFC according to flow information of the first data packet or is received by the second VNFC from a third VNFC; and select, according to the flow label of the first data packet, a first processing node configured to process the first data packet, wherein the first processing node is a processing node of the M processing nodes, and the first dispatch node and the M processing nodes belong to a first VNFC,
   wherein the first processing node is configured to: process the first data packet received by the first dispatch node to obtain a second data packet; determine that a granularity of flow information of the second data packet is finer than a granularity of the flow information for generating the flow label; and generate a new flow label according to the flow information of the second data packet.

5. The apparatus according to claim 4, wherein the first processing node is further configured to: select a dispatch node of a fourth VNFC according to the new flow label; and
the first dispatch node is further configured to send the second data packet and the new flow label to the dispatch node of the fourth VNFC selected by the first processing node.

6. The apparatus according to claim 5, wherein the first processing node is specifically configured to: obtain new flow information according to a flow classification granularity, and obtain the new flow label by performing hash calculation on the new flow information; or obtain flow information in a tunnel according to a feature of the tunnel, and obtain the new flow label by performing hash calculation on the flow information in the tunnel.

* * * * *